April 19, 1966 W. E. STUPAR 3,247,503

BINARY TO DECIMAL TRANSLATOR

Filed Jan. 5, 1960 2 Sheets-Sheet 1

FIG. I

INVENTOR
WESLEY E. STUPAR
BY Geo. Sievers
ATTORNEY

April 19, 1966 W. E. STUPAR 3,247,503

BINARY TO DECIMAL TRANSLATOR

Filed Jan. 5, 1960 2 Sheets-Sheet 2

INVENTOR.
WESLEY E. STUPAR
BY [signature]
ATTORNEY

United States Patent Office 3,247,503
Patented Apr. 19, 1966

3,247,503

BINARY TO DECIMAL TRANSLATOR

Wesley E. Stupar, Burbank, Calif., assignor to General Precision, Inc., a corporation of Delaware Filed Jan. 5, 1960, Ser. No. 596
2 Claims. (Cl. 340—347)

This invention relates to translators and, more particularly, to a translator for converting information received in one digital code to information in another digital code.

In many applications, such as at the output of a digital computer, it is often necessary to convert the digital representation of the computed results from one digital code to another. The computer, for example, may utilize a binary digital notation whereas output apparatus, such as a printer controlled by the computer, may require a decimal digital input. Depending, therefore, upon the circumstances, one digital code may be more appropriate for a particular function than a second digital code so that a translator for converting is required to convert between the first and second digital codes.

Prior translators for converting digital information from binary to decimal notation utilize a fairly complex arrangement of logical circuit elements such as "and" gates, "or" gates, relays, vacuum tubes and the like. In an illustrative embodiment of this invention, a relatively inexpensive, simple and reliable translator is provided which generates a count pulse for each decimal digit without the use of any logical circuit elements, and with a minimum of output circuitry the translator may be used with a decade counter to register the decimal information periodically or operate as a totalizer or integrator.

In an illustrative embodiment of this invention, binary digital signals are translated to decimal signals by utilizing a coded commutator disc which is engaged by a rotatable contact member. The commutator disc is divided into a number of angular sectors or zones, each of which is utilized for translating a particular binary digit of the input binary information. The angular sectors are divided into a number of concentric tracks which correspond individually to the decimal output digits.

The tracks are individually engaged by brushes which are supported by the rotatable contact member. As the brushes are rotated along the concentric tracks, they successively contact conductive strips which are radially positioned in the tracks in each of the angular sectors. In each of the angular sectors, the conductive strips form with their associated brushes switching conductive members which are electrically isolated from the conductive members in the other angular sectors. The number of conductive strips contacted by each of the brushes during the movement of the brush across a digital angular sector depends upon the significance of the particular binary digit associated with that sector.

The radial conductive strips in the digital angular sectors are energized in accordance with the input binary information. As the brushes are rotated adjacent to an energized strip, a count pulse is generated which is supplied to a decade counter. The significance of the decimal digit for which the generated pulse is counted is dependent upon the radial position of the concentric track and of the brush which generates the pulse. For example, if the radial conductive strips of the angular sector associated with the binary digit representing $2^2$ are energized by the binary signals, four pulses are provided for the least significant decimal digit. The reason is that the decimal value of $2^2$ is "4."

The coded disc also includes a number of continuous conductive tracks which correspond individually to the output decimal digits and from which the generated decimal pulses are supplied to a decade counter. A brush is provided on the rotatable contact member for each of these tracks as well as for the coded tracks. The brushes contacting the coded tracks are individually connected to the brushes contacting a continuous track so that, as the contact member is rotated, connections are successively established at the strips in accordance with the binary input information to generate a number of pulses which indicates the information in decimal form.

The conductive strips in the tracks are staggered so that two pulses of different decimal significance are not simultaneously generated. The avoidance of the simultaneous generation of two different significant pulses prevents confusion with a carry pulse in the decade counter.

Other features of this invention relate to the provision of two similar coded tracks in each of the digital angular sectors for each of the decimal digits. The two tracks are also angularly displaced from each other so that two successive pulses are generated for each count in the decimal notation as the brushes are rotated. The two successive pulses are utilized to set a flip-flop circuit to the true state and then reset the flip-flop circuit to the false state. The flip-flop circuit in turn steps an individually associated stage of the decade counter to increase the count in the stage by a decimal integer every time that the flip-flop circuit becomes reset to the false condition. Utilization of two pulses for each count eliminates spurious operation of the flip-flop circuit and the counter stage as a result of cracks or other discontinuities on the commutator disc.

Still other features of this invention relate to the provision of a ready signal at the completion of each translation from a binary to a decimal indication. The ready signal is connected to output apparatus which reads the decimal information registered in the decade counter. When the output apparatus has received the decimal information, it enables the translator to reset the decade counter and proceed to translate the next binary indication. The decade counter may be operated as a totalizer or integrator by not resetting it after each translation.

Further advantages and features will become apparent upon consideration of the following description when read in conjunction with the drawings.

Figure 2:
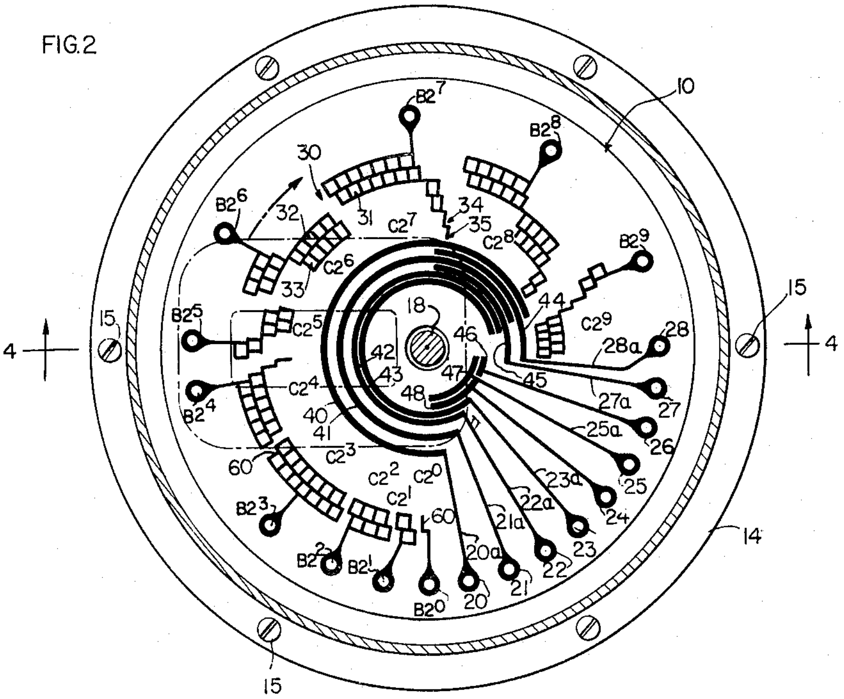
FIGURE 2 is a sectional view on the line 2—2 of FIGURE 4 and illustrates the commutator disc utilized in a translator embodying this invention.
Figure 5:
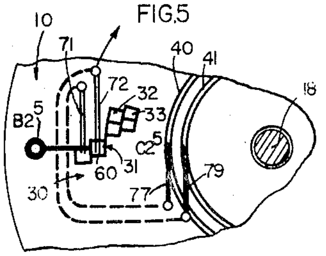
Figure 4:
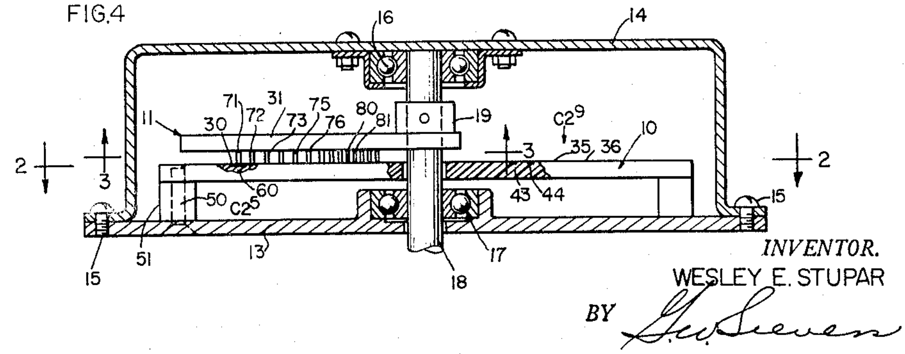

FIGURE 4 is a sectional view on the line 4—4 of FIGURE 2 and illustrates the relative positioning of the commutator disc and rotating contact member utilized in a translator embodying this invention; and FIGURE 5 is a partial plan view of the commutator disc shown in FIGURE 2 with the brushes of the contact member shown in full lines and the circuitry in phantom lines to illustrate their relative positioning in the translator of this invention.

Figure 1:
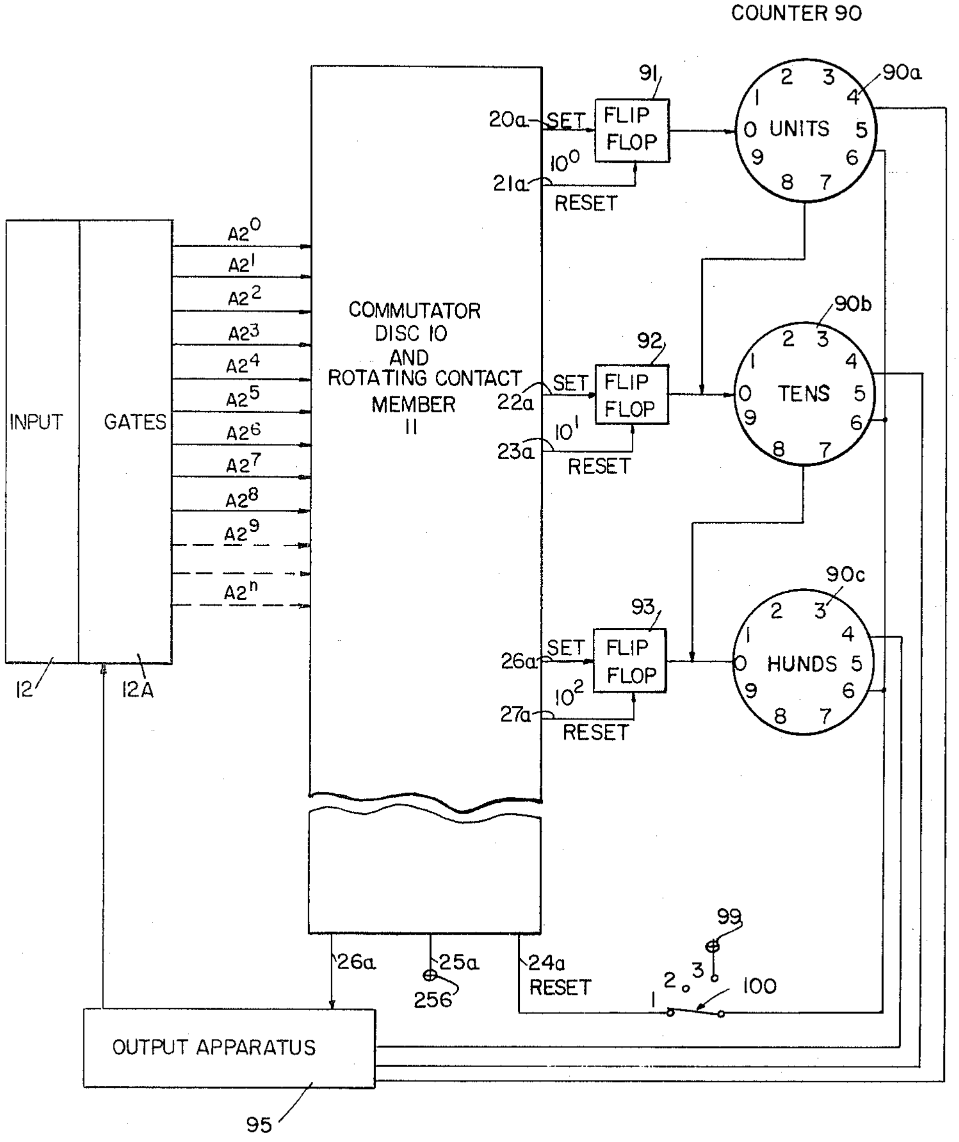
FIGURE 1 is a functional representation of a binary-to-decimal translator embodying this invention.

Referring first to FIGURE 1, an input apparatus 12 provides digital signals to an information member or coded commutator disc 10, the details of which are shown in FIGURE 2. The binary signals may be in the form of direct potentials with, for example, the leads $A2^0$ through $A2^n$ being selectively energized by +6 volt potentials. If the binary number which is being supplied by the input apparatus 12 is, for example, the ten digit number 1100001101 where the least significant digit is at the right, the leads $A2^9$ and $A2^8$, $A2^3$, $A2^2$ and $A2^0$ are at a potential of +6 volts with the rest of the input leads $A2^7$, $A2^6$, $A2^5$, $A2^4$ and $A2^1$ being at zero or ground potential. The commutator disc 10, shown in FIGURE 2, has a maximum input of 10 binary digits but, as indicated above, any number of binary digits may be utilized where the number of digits is either more or less than 10.

When only ten input binary digits are provided, the input leads $A2^0$ through $A2^9$ are connected respectively to the ten eyelets $B2^0$ through $B2^9$ which, as shown in FIGURE 2, are part of the commutator disc 10. The coded commutator disc 10 is supported on a plate 13 by a number of screws 50 and spacers 51, shown in FIGURE 4. The plate 13 is attached by means of a number of screws 15 to a housing 14 which, together with the plate 13, encloses the commutator disc 10 and a rotating brush block assembly or contact member 11. The contact member 11 is attached by means of a bushing 19 to a shaft 18 that is rotatably supported by two bearings 16 and 17. The bearings 16 and 17 are respectively attached to the housing 14 and the plate 13. As shown in FIGURE 4, the shaft 18 which is concentric with the coded disc 10, rotates the brush block assembly or contact member 11 in a plane which is paralled to the plane of the disc 10. During one revolution of the brush block 11, the input binary signals on the leads $A2^0$ through $A2^9$ are converted to digital signals which are supplied to a decimal or decade counter 90 as shown in FIGURE 1.

Referring now specifically to FIGURE 2 which illustrates the coding of the disc 10, the eyelets $B2^0$ through $B2^9$ would be respectively connected to the input leads $A2^0$ through $A2^9$ of FIGURE 1 and are angularly spaced about the disc 10. The disc or commutator 10 may be considered to be divided into ten angular code zones or sectors $C2^0$ through $C2^9$ which correspond to the ten input binary digits. Each of the angular code zones $C2^0$ through $C2^9$ contains a code area in the form of a conductive pattern which consists of a number of conductive strips 60, as shown. The strips 60 actually consist of single continuous conductive thin lines.

In addition to considering the disc 10 as being divided angularly into a number of zones, the disc 10 is also divided into six concentric tracks 30 through 35. Each pair of tracks is associated with a decimal digit of particular significance, with the tracks 30 and 31 being associated with the least significant decimal digit $10^0$ or units, the tracks 32 and 33 being associated with the next significant decimal digit $10^1$ or tens, and the tracks 34 and 35 being associated with the decimal digit $10^2$ or hundreds.

In zone $C2_0$, the strip in track 30 is one single line as is the strip in track 31 and these strips are electrically connected together. In zones $C2^1$ through $C2^9$, the strips are actually rectangular loops of interconnected metallic conductive material. However, the tracks 32 and 33 in zone $C2^4$ and tracks 34 and 35 in zone $C2^7$ are identical to the strips in tracks 30 and 31 in zone $C2^0$. For example, in the angular zone $C2^1$, the eyelet $B2^1$ is conductively coupled to the strips 60 which form two squares in zone $C2^1$. The conductive strips 60 in each of the zones $C2^0$ through $C2^9$ are at the same potential as the associated one of the eyelets $B2^0$ through $B2^9$ and, therefore, the associated one of the input leads $A2^0$ through $A2^9$. In the above example, with the binary input number being 1100001101 where the least significant digit is at the right, the conductive strips 60 in the conductive zones $C2^0$, $C2^2$, $C2^3$, $C2^8$ and $C2^9$ are at +6 volts, and the conductive strips 60 in the conductive zones $C2^1$, $C2^4$, $C2^5$, $C2^6$ and $C2^7$ are at zero volts.

The ten angular zones do not occupy equal sectors about the disc 10 nor do they occupy sectors the angles of which are related to each other by any simple arithmetic or geometric progression. The angular length of each of the zones $C2^0$ through $C2^9$ depends upon the particular coding for the associated digit to translate the digit into a number of radial strips 60 which will indicate, in decimal form, the same number.

The contact member 11, which as indicated above rotates adjacent to the coded disc 10, supports fourteen brushes 71 through 84. The brushes 71 through 76 engage, respectively, the tracks 30 through 35, and the brushes 77 through 84 contact the concentric tracks 40 through 48 which are hereinafter described. As the brushes 71 through 76 are rotated along the associated tracks 30 through 35, they contact in each of the zones $C2^0$ through $C2^9$ a particular number of radial strips 60 depending upon the coding of the strips 60 for the particular binary digit.

For example, in the zone $C2^5$, as illustrated particularly in FIGURES 2 and 5 by an arrow, the brushes 71 and 72 may be rotated in a clockwise direction with respect to the disc 10. As each brush rotates, it contacts two radial strips which are on opposite sides of two small squares respectively located in the tracks 30 and 31. If the strips 60 in zone $C2^5$ are energized, that is, at a potential of +6 volts, two pulses are generated through each of the brushes 71 and 72 as they pass across the radial strips 60 of the zone $C2^5$.

The particular coding in each of the zones $C2^0$ through $C2^9$ is to provide a number of pulses for each of the three decimal digits $10^0$, $10^1$ and $10^2$ which together indicate in decimal form the input binary number. The following table illustrates the coding:

| Binary Digit | Decimal Equivalent | Generated Pulses | | |
|---|---|---|---|---|
| | | $10^2$ | $10^1$ | $10^0$ |
| $2^0$ | 1 | | | 1 |
| $2^1$ | 2 | | | 2 |
| $2^2$ | 4 | | | 4 |
| $2^3$ | 8 | | | 8 |
| $2^4$ | 16 | | 1 | 6 |
| $2^5$ | 32 | | 3 | 2 |
| $2^6$ | 64 | | 6 | 4 |
| $2^7$ | 128 | 1 | 2 | 8 |
| $2^8$ | 256 | 2 | 5 | 6 |
| $2^9$ | 512 | 5 | 1 | 2 |

To translate, for example, the binary digit $2^5$, it is necessary to provide two pulses for the $10^0$ digit and three pulses for the $10^1$ digit because $2^5$ is equal to 32 in decimal notation. The coding of the strips 60 in the zone $C2^5$, as shown in FIGURES 1, 3 and 6 provide for this conversion as the brushes 71 and 74 are rotated along the tracks 30 and 33 in the zone $C2^5$.

Considering briefly, another illustration of the coding before proceeding with the description of the rest of the disc 10, the coding in the angular zone $C2^7$ provides eight pulses in each of the tracks 30 and 31, two pulses in each of the tracks 32 and 33 and a single pulse in tracks 34 and 35 as the brushes 71 through 76 pass respectively along these tracks.

Figure 3:
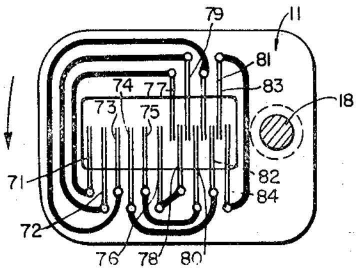
FIGURE 3 is a sectional view on the line 3—3 of FIGURE 4 and illustrates the brush arrangement of the rotating contact member utilized in a translator embodying this invention.

As shown in FIGURE 3, the brushes 71 through 76 are each electrically connected to another one of the brushes (77 through 82) which is also supported by the contact member 11. The brushes 77 through 82 contact respectively six substantially continuous output decimal tracks or rings 40, 44, 41, 45, 42 and 43 which are connected respectively to the output eyelets 20, 28, 21, 27, 22 and 23. As the brushes 71 through 82 are rotated along the tracks 30 through 36 and 40 through 45, the strips 60 in the zones $C2^0$ through $C2^9$ are successively engaged so that those which are energized provide for a pulse through a pair of brushes and one of the rings 40 through 45 to its associated eyelet.

For example, with the input binary number being 1100001101, as the brush 71 passes along track 30, it engages in zone $C2^0$ one energized radial strip 60 to generate one pulse through the brush 71, the brush 77, and the ring 40 to the output eyelet 20. As is described hereafter, the output eyelet 20 is coupled to the first or least significant state 90*a* of the decade counter 90. In the zone $C2^0$, radial conductive strips 60 are provided only for the least significant decimal digit $10^0$ so that pulses are generated only for the least significant stage 90*a* of the counter 90.

In the input binary number, the second least significant digit is zero so that the strips 60 in the zones $C2^1$ are not energized and pulses are therefore not generated when the brushes 71 through 76 pass along the tracks 30 through 35 across the zone $C2^1$. The value of the next significant binary digit $C2^2$, however, is a "1" in the example expressed above so that the conductive strips in the zone $C2^2$ are energized. In zone $C2^2$, each of the tracks 30 and 31 includes four radial conductive strips 60 so that four pulses are generated through brush 71 and through brush 72 as the brushes 71 and 72 pass across the angular zone $C2^2$.

The translating sequence continues in this manner as the brushes 71 through 82 are rotated around the disc 10. In each of the energized zones $C2^0$ through $C2^9$, a particular number of pulses are generated for each of the three significant decimal digits so as to indicate, in decimal form, the input binary information.

As will be discussed in detail subsequently, the tracks 30 and 31 are similar to each other; the tracks 32 and 33 are similar to each other; and the tracks 34 and 35 are similar to each other. The tracks in each pair are actually angularly displaced from each other by a small angle, as best shown in FIGURE 2, so that each pulse generated from the outside track of each pair of tracks is always immediately followed by a second pulse from the inside track of said pair. This action resets the flip-flops 91, 92 and 93 preparatory to actuate the counter 90 on the next pulse.

As shown in FIGURE 2, the leads 20*a*, 21*a*, 22*a*, 23*a*, 27*a* and 28*a* are connected respectively to the eyelets 20 through 23, 28 and 27, and are also connected to three flip-flop circuits 91 through 93. More specifically, the leads 20*a*, 22*a* and 28*a* are connected respectively to the set terminals of the flip-flop circuits 91 through 93 and the leads 21*a*, 23*a* and 27*a* are connected respectively to the reset terminals of the flip-flop circuits 91 through 93, as shown in FIGURE 1.

Each of the flip-flop circuits 91 through 93 is a bistable circuit having two equilibrium conditions referred to as "set" and "reset" conditions. The "set" condition corresponds to the true state of the flip-flop and the "reset" condition corresponds to the false state of the flip-flop. A positive pulse at the set terminal causes the flip-flop circuit to become set to its true condition and a positive pulse at its reset terminal causes the flip-flop to become reset to its false condition.

As will be seen from the arrows in FIGURES 2, 3 and 5, when the brushes are rotated clockwise, the pulses generated from the track 30 lead the pulses generated from the track 31 because of the small angular displacement described above for these two tracks. For each pair of associated pulses from the two tracks 30 and 31, the first pulse passes through lead 20*a* to set the flip-flop circuit 91 to the true state, and the second pulse passes through lead 21*a* to reset the circuit 91 to the false state. In a similar manner, the pulses generated from the tracks 32 and 33 respectively set the flip-flop circuit 92 to the true state and reset the flip-flop to the false state. Similarly, the pulses generated from the tracks 34 and 35 respectively set the flip-flop circuit 93 to the true state and reset the flip-flop to the false state.

As the brushes 71 through 82 are rotated, therefore, the flip-flop circuits 91, 92 and 92 are set to the true state and reset to the false state for each decimal count or indication from the commutator disc 10. A stepping pulse for the counter 90 is provided by the flip-flop circuits when they are reset to their false conditions. Since the circuits 91 through 93 are connected respectively to the stages 90*a* through 90*c* of the counter 90, the stages 90*a* through 90*c* of the counter become, therefore, respectively stepped when the associated flip-flop circuits are reset to their false conditions.

The double coded tracks for each decimal digit eliminate false operation due to discontinuities or dirt on the commutator disc 10 and provide a continuous check of the accuracy on the translation. For example, if the flip-flop circuit 91 is set by a spurious signal, it remains set until a pair of count pulses from the tracks 30 and 31 are supplied as set and reset pulses to the circuit. The first or set pulse does not change the condition of the circuit 91 and the reset pulse causes it to trigger back to its false condition. When the circuit 91 resets, it provides a count pulse to the counter stage 90*a*. During the time the flip-flop circuit is set to its true condition, a count pulse is not provided to the stage 90*a* so that the spurious signal which sets the circuit 91 does not destroy the translating accuracy.

The stages 90*a* through 90*c* of the counter 90 are serially connected so that when a count of 10 is reached by any stage, a carry or count pulse is provided to the next significant or adjacent stage. For example, the tenth pulse from the flip-flop circuit 91 to the stage 90*a* sets it to register "0" and causes it to provide a carry pulse of "1" to the stage 90*b* to increase the count in the stage 90*b* by an integer.

As indicated in FIGURE 1, the counter 90 may include any number of serially connected stages depending upon the number of input binary digits and what type of output information is required. The output information may either be a decimal indication of each binary input number with the counter 90 being reset after each translation, or the information may be a decimal indication of the accumulation or sum of a number of binary input numbers. If the latter, a larger number of counter stages is utilized. Before describing the operation of the translator to provide these two types of output information, the operation of the translator and, in particular, the stages 90*a* through 90*c* of the counter 90 are briefly described for the binary input number 1100001101 mentioned as an example above.

For the input number 1100001101, the strips 60 in the zones $C2^0$, $C2^2$, $C2^3$, $C2^8$ and $C2^9$ are energized at a potential of +6 volts, and the strips 60 in the rest of the zones are at ground potential. As the contact member 11 rotates in a clockwise direction when viewed from FIGURE 2, the brushes 71 through 76 successively contact the energized strips 60 in the zones $C2^0$, $C2^2$, $C2^3$, $C2^8$ and $C2^9$ to generate pulses for introduction to the flip-flop circuits 91 through 93. The contact member 11 is rotated at a relatively high speed which may be 1000 revolutions per minute so that the pulses to the circuits 91 through 93 are brief. At 1000 revolutions per minute, the contact member 11 completes a revolution in 60 milliseconds, the spacing between the radial strips 60 in each of the tracks 30 through 35 provide for an interpulse interval of approximately 0.6 millisecond. The width of the radial strips 60 provides for a duration of approximately 0.06 millisecond in the pulses introduced to the flip-flop circuits 91 through 93.

For the binary input number 1100001101, when the contact member rotates across the zones $C2^0$, a 0.06 millisecond pulse is produced first to set the circuit 91 to the true state and then a reset pulse is produced to reset the flip-flop circuit 91 to the false state. The spacing between pulses from any track as indicated above is 0.6 millisecond but, because the track 31 is staggered with respect to the track 30, the reset pulse follows the set pulse by the smaller interval of 0.3 millisecond.

After the member 11 has passed the zone $C2^0$, the counter stages 90*a*, 90*b* and 90*c* register respectively 1, 0 and 0. The strips 60 in the zone $C2^1$ are not energized so that the registration of the counter 90 does not change as the contact member 11 passes through the zone $C2^1$. The following table illustrates the registration in the stages 90$a$, 90$b$ and 90$c$ during each successive step of the translation of the binary number 1100001101 as the contact member 11 rotates along the disc 10:

| Input | Zone | Number of Pulses to— | | | Registration | | |
|---|---|---|---|---|---|---|---|
| | | 90c | 90b | 90a | 90c | 90b | 90a |
| 1 | $C2^0$ | 0 | 0 | 1 | 0 | 0 | 1 |
| 0 | $C2^1$ | 0 | 0 | 0 | 0 | 0 | 1 |
| 1 | $C2^2$ | 0 | 0 | 4 | 0 | 0 | 5 |
| 1 | $C2^3$ | 0 | 0 | 8 | 0 | 1 | 3 |
| 0 | $C2^4$ | 0 | 0 | 0 | 0 | 1 | 3 |
| 0 | $C2^5$ | 0 | 0 | 0 | 0 | 1 | 3 |
| 0 | $C2^6$ | 0 | 0 | 0 | 0 | 1 | 3 |
| 0 | $C2^7$ | 0 | 0 | 0 | 0 | 1 | 3 |
| 1 | $C2^8$ | 2 | 5 | 6 | 2 | 6 | 9 |
| 1 | $C2^9$ | 5 | 1 | 2 | 7 | 8 | 1 |

The decimal equivalent of the binary number 1100001101 is 781 which are the digits registered respectively in the stages 90$c$, 90$b$ and 90$a$ of the counter 90 when the translation is complete.

During the time the contact member 11 is rotating adjacent zone $C2^8$, which is energized in the example given above, the first pulse to the stage 90$a$ causes the stage 90$a$ to register 0 and to produce a carry pulse for introduction to the stage 90$b$. If the pulses from the flip-flop circuit 92 coincide in time with the carry pulses from the stage 90$a$, only a single count will be registered each time instead of two. It is necessary, therefrom, that the pulses from the circuits 92 and 93 are not synchronized with the respective carry pulses. The desynchronization is provided by staggering each pair of tracks with respect to the other two pairs of tracks. As shown in FIGURE 2, the three pairs of tracks 30–31, 32–33 and 34–35 are staggered so that the pulses from different tracks can never occur at the same time. Actually it is the pulses from the three tracks 31, 33 and 35 which provide the reset pulses that must be staggered since a count pulse is provided when the flip-flop circuits 91 through 93 become reset to the false state.

Toward the end of one rotation of the contact member 11, the brushes 83 and 84, which are electrically connected, contact respectively two relatively short tracks 46 and 47. The tracks 46 and 47 are concentric with the coded tracks 30 through 35 and the substantially continuous rings or tracks 41 through 45. When the brushes 83 and 84 contact the tracks 46 and 47, a path is completed from a potential source 25$b$, shown in FIGURE 1, through the lead 25$a$ connected to the eyelet 25 in FIGURE 2, track 47, brush 84, brush 83, eyelet 26 and lead 26$a$ to the output apparatus 95.

The signal introduced from the source 25$b$ to the output apparatus 95 functions as a ready or start signal to the apparatus 95 to indicate that the translation stored in the counter 90 is completed. The apparatus 95, which may be a printer or other read-out equipment, thereupon reads the decimal indication stored in the counter 90 and applies an enabling signal to the input apparatus 12 to indicate the reading operation is complete.

The operation of the output apparatus 95 is quite rapid so that by the time the brush 83 leaves the short track 46, the read-out sequence is completed. After leaving the track 46, the brush 83 contacts another track 48 which is at the same radial distance as the track 46. When the brush 83 contacts the track 48, it completes a path for resetting the counter 90 to a decimal value of "0" so as to prepare the counter for the next translating sequence. The reset path is from the potential source 25$b$ in FIGURE 1 to lead 25$a$, eyelet 25, track 47, brush 84, brush 83, track 48, eyelet 24, lead 24$a$ and a switch 100 to the stages 90$a$ through 90$c$ of the counter 90.

The switch 100 may be set in any one of three positions 1 through 3. When set in position 1, it completes the path for the reset pulse from the commutator disc 10 to the counter 90 so that the counter 90 is automatically reset after each translation. If the switch 100 is set at its second position, the reset path is open and the counter 90 is not automatically reset. The next translation provides count pulses to the stages 90$a$, 90$b$, 90$c$, etc., which are added to the previous registration. This step in effect programs the translator to function as an integrator. The counter 90 functions, therefore, as an integrator when the switch 100 is set at its second position to provide a cumulative count of the sum of the translated numbers. The third position of the switch 100 is a manual-reset position as it connects a potential source 99 to reset the counter stages 90$a$, 90$b$, etc., to a value of "0."

As described above when the apparatus 95 reads the registered decimal number, it introduces an enabling signal to the input apparatus 12. The enabling signal from the output apparatus 95 is introduced to a bank of enabling gates 12A in the input apparatus 12 to open the gates for the introduction of a new binary indication through the gates to the different input terminals of the commutator disc 10. The enabling signal indicates that the readout sequence is completed so that the next binary number can be supplied through the leads $A2^0$ through $A2^9$ to the commutator disc 10. Actually, the enabling signal is only to insure the successive operation of the translator and the output apparatus. This interaction is referred to an interlocking the output apparatus 95 with the translator because the output apparatus 95 does not operate until it receives a signal from the translator at the end of a translating sequence and the translator cannot operate unless it receives an enabling signal from the apparatus 95 at the end of a read-out sequence.

Although this application has been disclosed and illustrated with reference to particular applications, the principles involved are susceptible of numerous other applications which will be apparent to persons skilled in the art. For example, the translating means instead of being conductive strips and brushes, may be apertures and photoelectric means of the type utilized in position input converters or may be coded magnetic material and sensing heads. Because of this, the brushes included in the invention do not necessarily have to engage their associated tracks. As another example, the invention can be used in converting from any first digital radix to any second digital radix different from the first digital radix. In the embodiment shown in the drawings and described above, the first digital radix is binary and the second digital radix is decimal. It is evident, therefore, that various modifications are possible without departing from the spirit and scope of this invention. The invention is, therefore, to be limited only as indicated by the scope of the appended claims.

I claim:

1. A translating device for converting numerical digits on radix "two" to digits of equal value on a different radix comprising a commutator having angularly separated groups of conductors adapted to be selectively energized to register input digits on radix "two";

each of said groups including a plurality of angularly spaced conductive elements corresponding in number to the value of the input digit expressed on another radix, means for successively scanning said elements, and means controlled by said scanning means for emitting electrical impulses equal in number to the value of the input digits expressed on said other radix.

2. A translating device according to claim 1 in which each of said groups includes a plurality of radially spaced rows of angularly spaced conductive elements; each row being of the same ordinal significance with respect to the input digit but of different ordinal significance with respect to the output.

(References on following page)

References Cited by the Examiner

UNITED STATES PATENTS

| | | | |
|---|---|---|---|
| 1,332,976 | 3/1920 | Dowd | 340—364 |
| 2,162,170 | 6/1939 | Hicks et al. | 340—347 |
| 2,207,743 | 7/1940 | Larson et al. | 340—347 |
| 2,533,242 | 12/1950 | Gridley | 340—347 X |
| 2,649,513 | 8/1953 | Luhn | 340—347 |
| 2,701,357 | 2/1955 | Newly | 340—364 |
| 2,714,204 | 7/1955 | Lippel | 340—347 |
| 2,747,797 | 5/1956 | Beaumont | 340—347 |
| 2,755,020 | 7/1956 | Belcher | 340—347 |
| 2,779,539 | 1/1957 | Darlington | 340—347 |
| 2,792,174 | 5/1957 | Rutter | 340—347 |
| 2,866,184 | 12/1958 | Grey | 340—347 |
| 2,873,440 | 2/1959 | Speller | 340—347 |
| 2,873,441 | 2/1959 | Miller | 340—347 |
| 2,907,020 | 9/1959 | Champion | 340—317 |
| 2,976,104 | 3/1961 | Petersen | 340—364 |
| 2,978,561 | 4/1961 | Dreyer | 340—347 |
| 3,024,986 | 3/1962 | Strianese et al. | 340—359 |

MALCOLM A. MORRISON, *Primary Examiner.*

IRVING L. SRAGOW, *Examiner.*